United States Patent [19]
Grosser et al.

[11] Patent Number: 5,725,267
[45] Date of Patent: Mar. 10, 1998

[54] ENERGY-ABSORBING ELEMENT

[75] Inventors: Ulrich Grosser, Kürten; Boris Koch, Wermelskirchen, both of Germany

[73] Assignee: Bayer Aktiengesellschaft, Germany

[21] Appl. No.: 646,877

[22] Filed: May 8, 1996

[30] Foreign Application Priority Data

May 22, 1995 [DE] Germany ............ 195 18 366.5

[51] Int. Cl.⁶ ............................................. B60R 19/34
[52] U.S. Cl. ............................................. 293/133
[58] Field of Search ........................ 293/132, 133; 188/371, 372

[56] References Cited

U.S. PATENT DOCUMENTS 3,138,118  6/1964  Dean ............................. 293/132
3,146,014  8/1964  Kroell ........................... 293/133
3,633,934  1/1972  Wilfert .......................... 293/133

FOREIGN PATENT DOCUMENTS 529433  3/1993  Australia ........................ 293/133

*Primary Examiner*—Stephen Avila
*Attorney, Agent, or Firm*—Connolly & Hutz

[57] ABSTRACT

The present invention relates to an absorption element for absorbing kinetic energy, in particular that of vehicles, such as for example motor vehicles. The absorption element is particularly suitable as part of an absorption system of vehicle bumpers which absorb energy released during a collision, in order to prevent structural deformations of the bumper or vehicle. The absorption element can also be used as part of a seat structure or other passive safety elements.

2 Claims, 6 Drawing Sheets

ENERGY-ABSORBING ELEMENT

The present invention relates to an absorption element for absorbing kinetic energy, such as for example energy which is released during motor vehicle accidents. The absorption element is particularly suitable for use as part of an absorption system in motor vehicle bumpers which absorb energy released during a collision, in order to prevent structural deformations in the vehicle. The absorption element can also be used as part of a seat structure or other passive safety elements.

Energy-converting systems, particularly for use in the bumper section of vehicles, are known and successfully used. Bumper systems are widely employed which survive minor accidents (at a collision speed of up to 8 km/h) without damage due to energy-absorbing elements. In order to obtain less expensive risk categories from vehicle insurers many vehicle manufacturers have for some time been in search of shock-absorbing systems which can withstand crash speeds of considerably higher than 10 km/h. (In the USA bumper systems with a damage-free crash speed of up to 8 km/h are in general use.) It is possible to differentiate between so-called reversible and non-reversible systems. Reversible systems are for example hydraulic shock absorbers with gas-pressure springs. Such systems have very effective conversion properties and high performance. At lower conversion rates quasi-reversible or non-reversible systems, such as for example foam blocks made of energy-absorbing (EA) foam, PU foam or aluminium foam are used.

The space available for the incorporation of the above-mentioned systems is usually small. The high kinetic energy to be converted requires that such absorption systems have ideal force-deformation curves. A further requirement of such absorption systems is their non-dependence on climatic and weather conditions.

They are required to be non-ageing and to function satisfactorily regardless of the ambient temperature. All the known systems do however to some extent only function unsatisfactorily and in a non-reproducible manner under the aforementioned conditions. The most efficient systems (hydraulic shock-absorbing systems) are technically complicated to produce and service and are therefore relatively expensive.

The invention is based on the problem of developing an energy-absorbing element which is superior in performance to the currently used hydraulic shock absorbers and has higher conversion rates, and which thus converts kinetic energy, such as for example that of a moving vehicle mass, into thermal energy within the smallest possible space. The system should be simple to handle, inexpensive and light and should also function reproducibly over the entire remaining period of use.

This problem is solved according to the invention by an absorption element for absorbing kinetic energy, in particular for use as part of a safety structure, such as for example in vehicles, consisting at least of a metal absorption sheet, a holding-down device and a support, which components are connected to each other on the flange of a supporting structure by means of releasable fastening elements, so that the metal absorption sheet is held between the holding-down device and the support by means of a predetermined force in an arrangement similar to a clamping connection, and a piston preferably having a rectangular cross-section which is optionally connected to the metal absorption sheet via a fastening element, wherein the supporting structure has such an internal cross-section that the piston can penetrate into the supporting structure together with the metal absorption sheet connected thereto during the absorption of energy.

By means of the selected arrangement of its components the absorption element according to the invention enables the kinetic energy acting upon it to be converted in an almost ideal manner over a given deformation path. The predetermined force is almost non-dependent on speed and is constant over the whole deformation path. Given a predetermined maximum permissible deformation path this results in a maximum conversion of energy without the supporting structure which bears the absorption element being deformed or destroyed as a result of force maxima.

In short, the following advantages are obtained over the prior art with the absorption element according to the invention.

Given a predetermined deformation path, almost 100% absorption is obtained (i.e. the element has an almost ideal force-deformation curve). The element is inexpensive to produce and can be quickly replaced after deformation. The absorption element has a low weight and readily adapts itself to the application of force. The absorption element functions independently of temperature or ageing.

Typical materials which are suitable for the metal absorption sheet are structural steels such as for example those ranging from grade St 37 to deep-drawing metal sheet grades St 14/St 12. The sheet metal element can be protected from corrosion by enamelling, phosphatising, or galvanising etc. The sheet metal strip is cut for example from a steel strip and then optionally preshaped by means of pressing processes. Supports or holding-down devices, which can optionally be in each case in the form of a frame, are usually produced by stamping or deep-drawing.

Suitable materials for the piston are optionally glass-reinforced thermoplastics, such as for example PA 6, PA 66, PBT or metals. Depending on the material used the piston can be produced by injection-moulding, die-casting or stamping or deep-drawing processes.

The energy-absorbing element according to the invention is particularly suitable for use in the front or rear bumper systems of motor vehicles, although it is also suitable for use in knee absorbers, seat structures and other passive safety components. The invention is explained below in-more detail by way of example with the aid of the figures.

Figure 1:
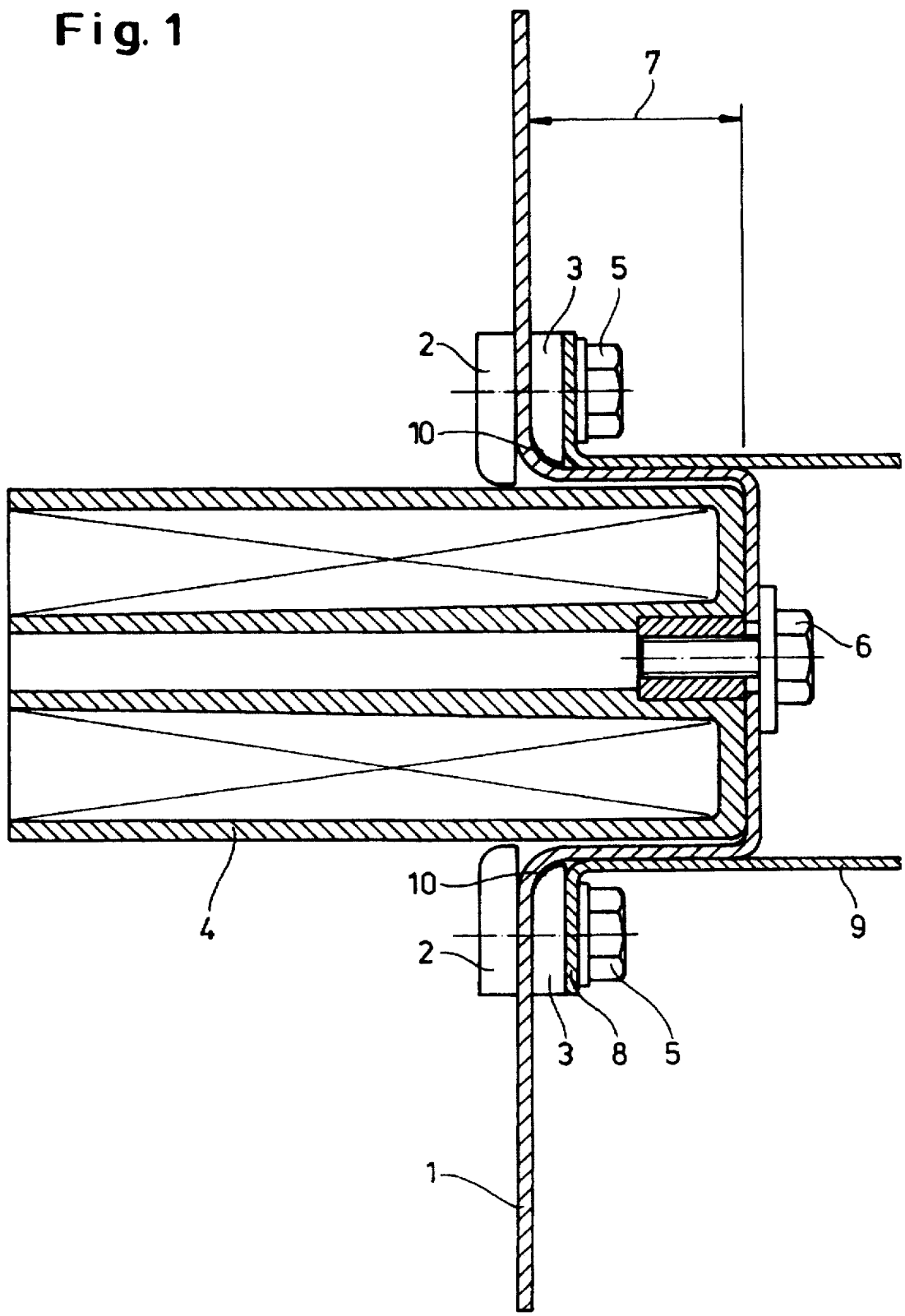
FIG. 1 is a horizontal cross-section through an energy-absorbing element according to the invention.

The absorption element consists of a metal absorption sheet 1, two clamping frames 2 and 3, a piston 4 and at least four screws 5 for prestressing the sheet metal strip 1 between clamping frames 2 and 3. The piston 4 is fastened to the sheet metal strip 1 by means of a screw 6. The sheet metal strip 1 is preshaped with a precisely defined indentation depth 7. The whole system is fastened to the flange 8 of a support 9. In a collision with a barrier or similar object the piston 4 penetrates into the support 9 and thereby deforms the sheet metal strip 1. The latter is continuously bent and pulled via the bending radius 10 of the clamping frame 3 and thereby absorbs energy. In addition the sheet metal strip 1 is pulled through the two clamping frames 2 and 3, which are prestressed via screws 5, and thereby also absorbs energy as a result of friction. In one embodiment the sheet metal strip 1 is designed in the form of an unbent straight strip of sheet metal without any specific penetration depth (see also FIG. 2).

EXAMPLE 1

Figure 2:
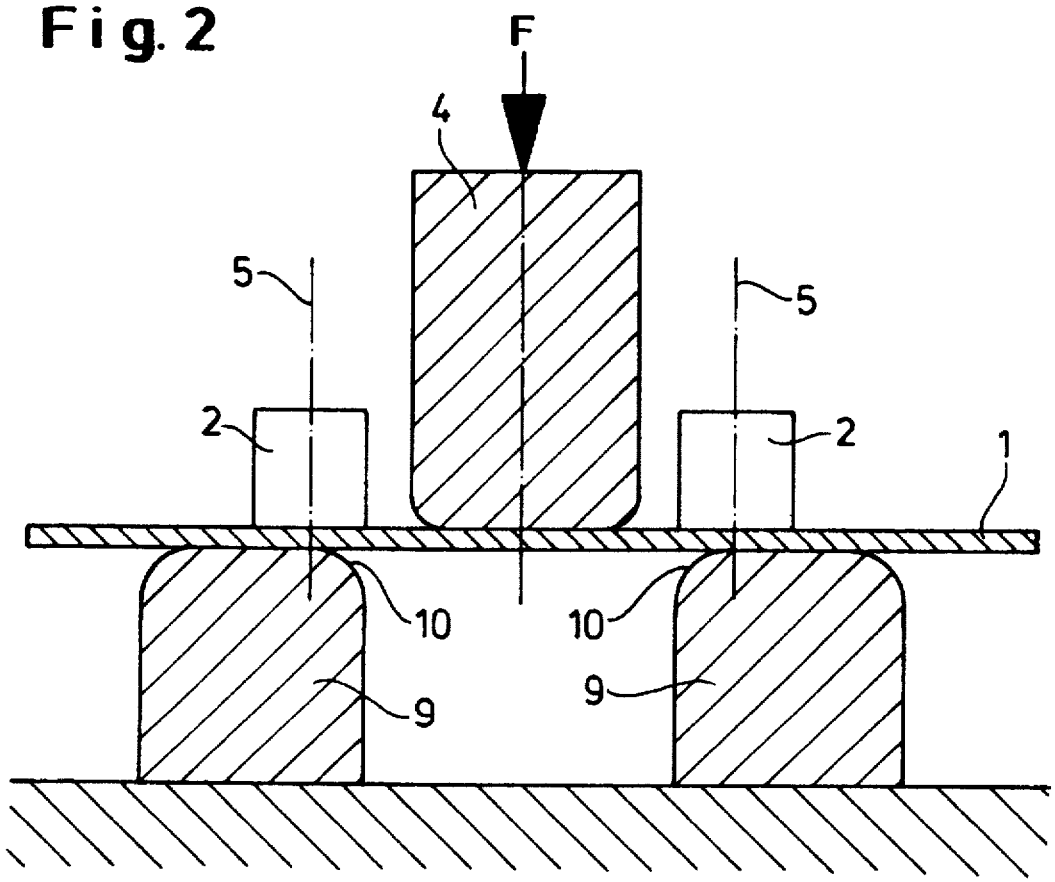
FIG. 2 is a diagrammatic cross-section through a corresponding experimental setup.
Figure 3:
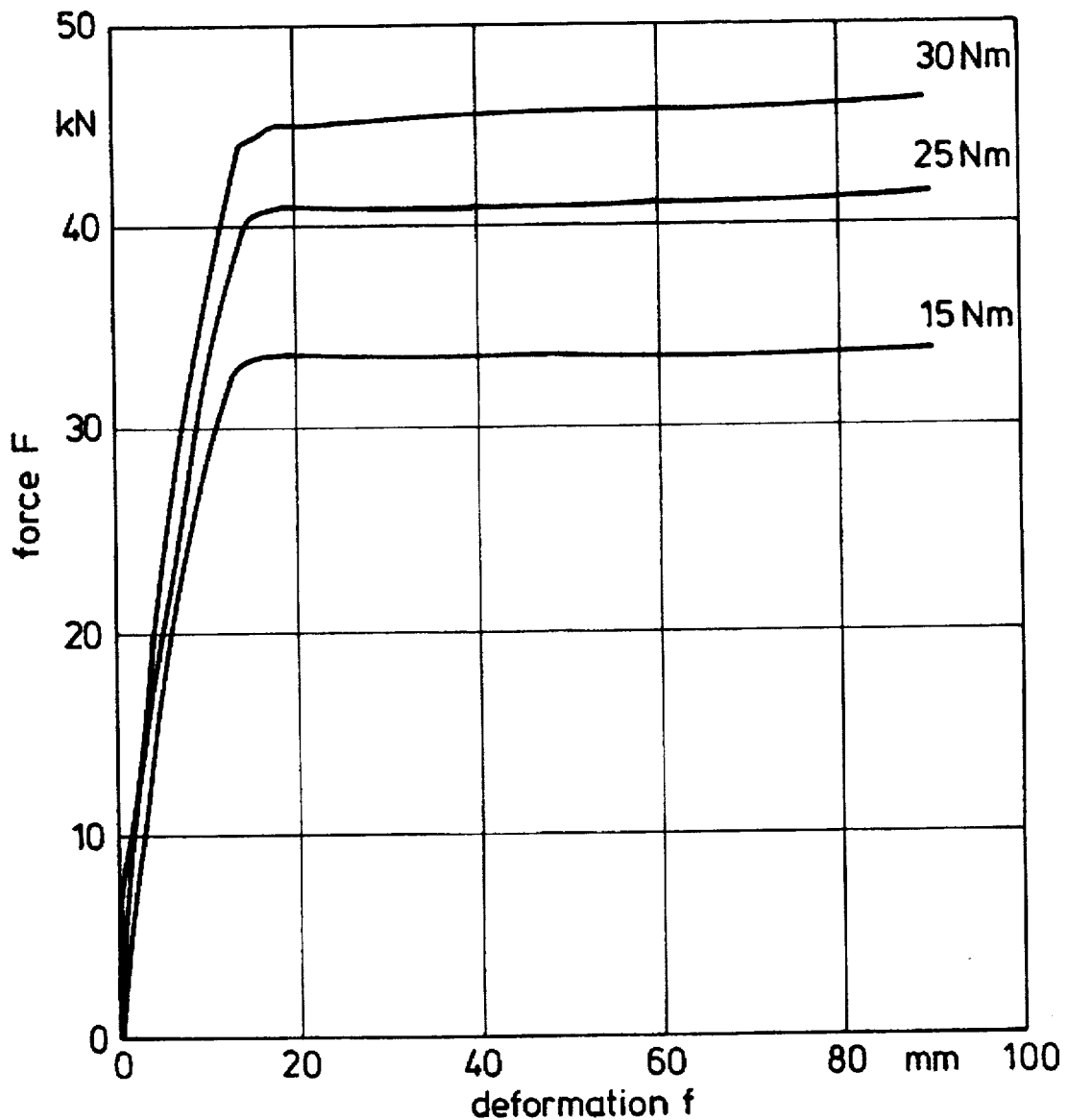
FIGS. 3 to 6 are force/deformation diagrams obtained using an experimental setup according to FIG. 2.

Using an experimental setup according to FIG. 2 force/deformation curves were determined which illustrate the function of a corresponding absorption element. In this setup the support blocks 10 assume the function of both the clamping frame 3 and the support 9 comprising flange 8. In FIG. 3 a distance of 55 mm between the supports 10, a metal sheet thickness of 2 mm and a gap distance between the piston 4 and the support 10 of 2.5 mm on each side was selected. The flat sheet metal strip was held with a prestressing force of 15, 25 and 30 Nm. In each case the piston was pressed into the metal sheet via a hydraulic cylinder. The resistance is reflected in the respective deformation curves. As is shown, the curves in each case follow a horizontal path as from 12 min. This corresponds to the deflection process of the metal sheet 1 to form a U-shape.

EXAMPLE 2

Figure 4:
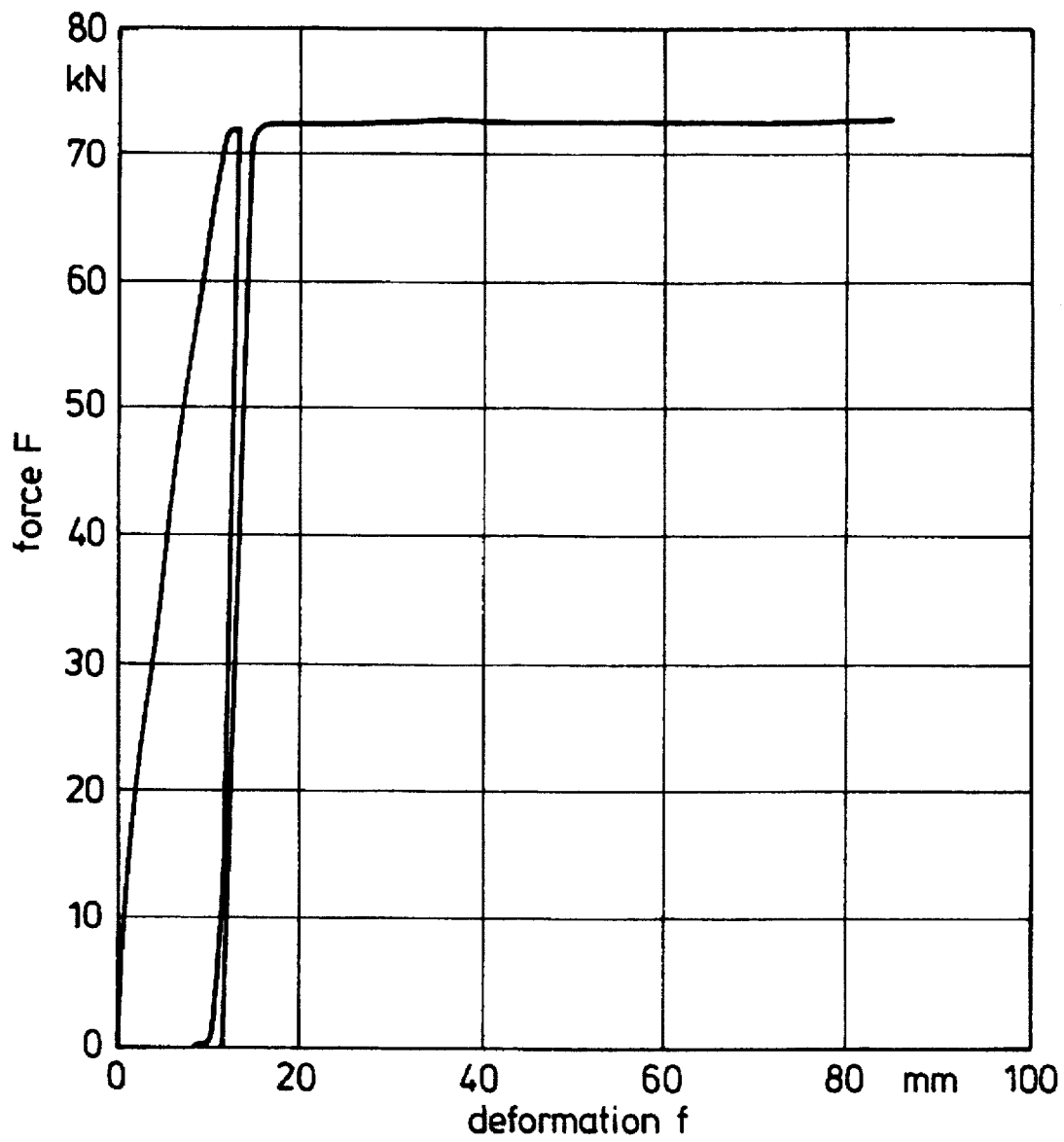
Figure 5:
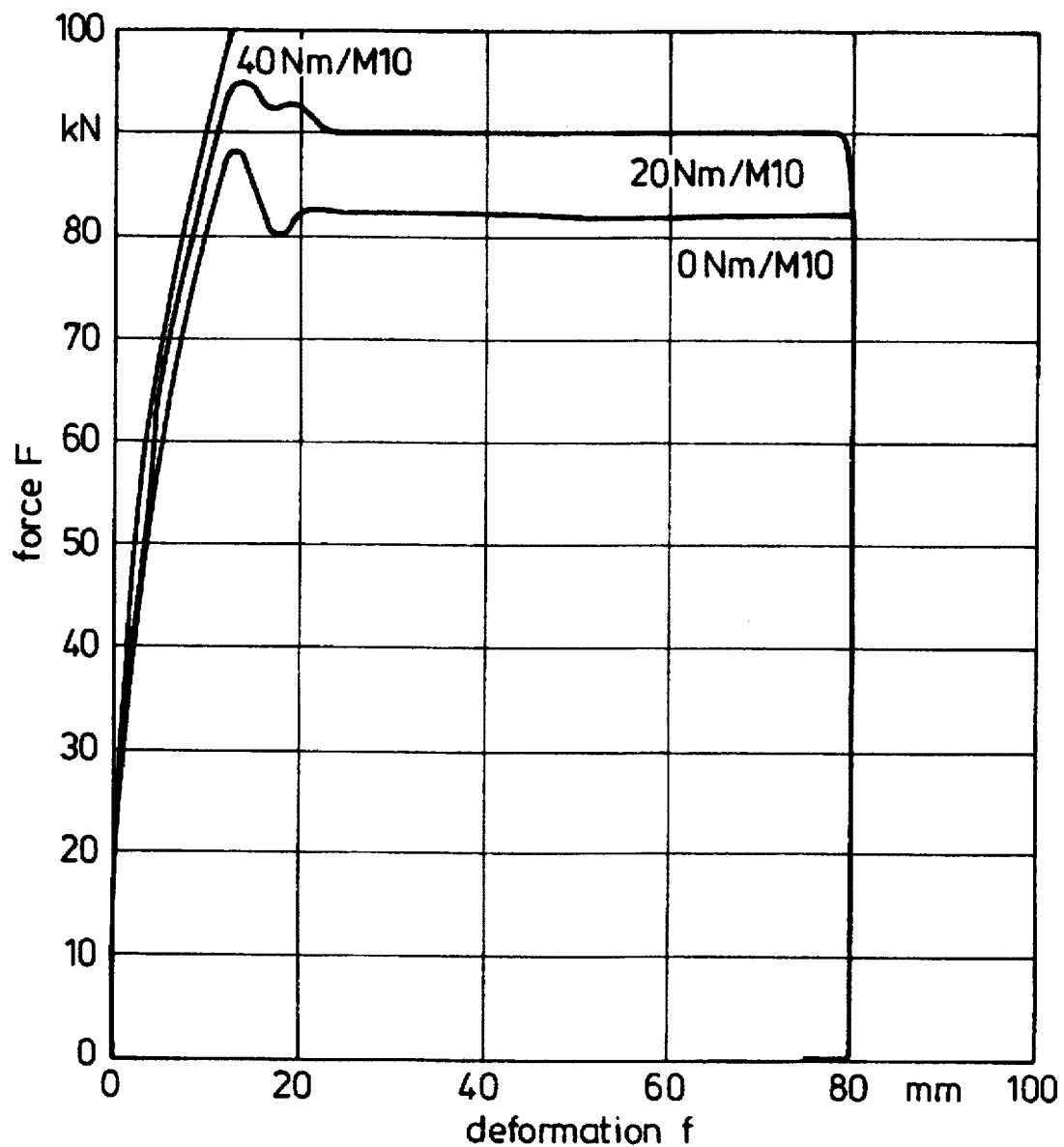
Figure 6:
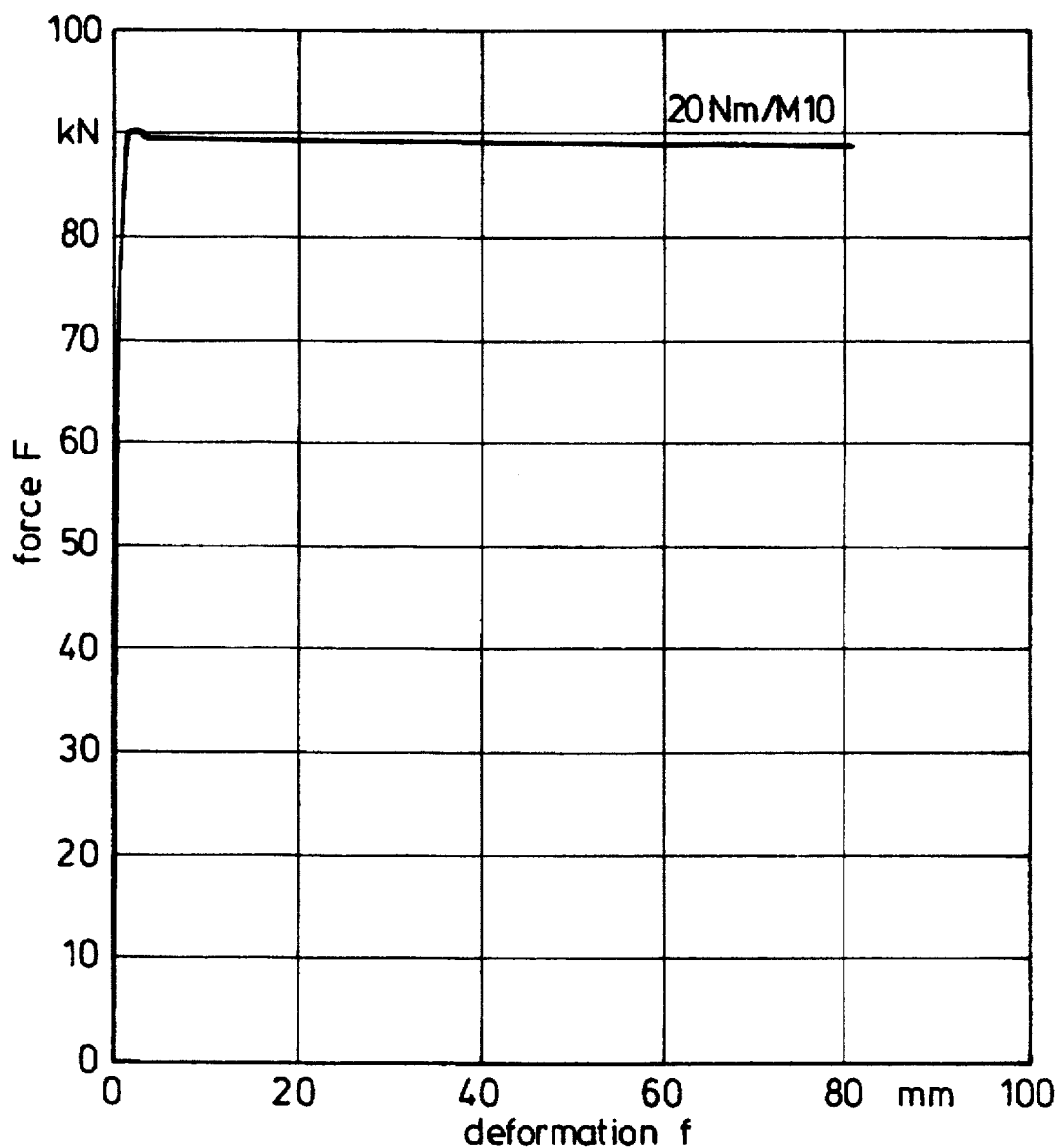

In another test corresponding to Example 1 pressure was released after the formation of the U-shape and then the load was immediately reapplied (see the break in the curve in FIG. 4). The distance between the supports was 56 mm, the thickness of the metal sheet 3 mm, the gap width 3 mm and the initial torque 40 Nm.

EXAMPLE 3

In Example 3 the thickness of the metal sheet was increased further (4 mm), the distance between the supports was 56 mm, the gap width was 4.25 mm and the rate of penetration of the piston was 0.6 m/min. The overlying curves illustrate the function of the setup at an initial stress of 0.20 and 40 Nm.

EXAMPLE 4

Example 3 was repeated under the same conditions, but using a U-shaped sheet metal strip which was preshaped with a depth of 12 mm. The rate of penetration was 4.42 m/min. in this example. The curve shows the required almost ideal force/deformation path for an initial stress of 20 Nm.

We claim:

1. An absorption element for absorbing kinetic energy in a safety structure in vehicles comprising a metal absorption sheet, a holding-down device for the sheet and a support for the sheet, supporting structure for supporting the absorption sheet, the holding-down device and the support for the sheet, releasable fastening elements holding the absorption sheet between the holding-down device and the support for the sheet at a predetermined force, and a movable piston adjacent to the metal absorption sheet, and wherein the supporting structure has a cavity for receiving the piston whereby the piston penetrates into the supporting structure together with the metal absorption sheet connected thereto during the absorption of energy, and wherein the metal absorption sheet is pulled through the holding-down device and the support for the sheet during the absorption of energy to thereby additionally absorb energy as a result of fiction.

2. An absorption element according to claim 1, wherein the metal absorption sheet surrounds the piston in the form of a U-shaped section and penetrates the supporting structure in a tight-fitting manner before the absorption of energy takes place.

* * * * *